(12) United States Patent
Kondo et al.

(10) Patent No.: US 12,083,452 B2
(45) Date of Patent: Sep. 10, 2024

(54) OUTER CYLINDER SCREEN WASHING APPARATUS OF SCREW PRESS

(71) Applicant: ISHIGAKI COMPANY LIMITED, Tokyo (JP)

(72) Inventors: Atsushi Kondo, Kagawa (JP); Kuniyoshi Oonishi, Kagawa (JP); Yuuichi Ishizaki, Kagawa (JP); Hideki Fujisawa, Kagawa (JP); Yasufumi Azuma, Kagawa (JP); Atsumi Kitayama, Kagawa (JP); Takuho Kimura, Kagawa (JP); Nobuo Honda, Kagawa (JP)

(73) Assignee: ISHIGAKI COMPANY LIMITED, Tokyo (JP)

( * ) Notice: Subject to any disclaimer, the term of this patent is extended or adjusted under 35 U.S.C. 154(b) by 250 days.

(21) Appl. No.: 17/876,143

(22) Filed: Jul. 28, 2022

(65) Prior Publication Data

US 2023/0097066 A1    Mar. 30, 2023

(30) Foreign Application Priority Data

Sep. 17, 2021  (JP) ................................. 2021-151728

(51) Int. Cl.
*B01D 29/64* (2006.01)
*B01D 29/11* (2006.01)
(Continued)

(52) U.S. Cl.
CPC ........ *B01D 29/6446* (2013.01); *B01D 29/117* (2013.01); *B30B 9/14* (2013.01);
(Continued)

(58) Field of Classification Search
CPC .. B30B 9/12; B30B 9/121; B30B 9/14; B30B 9/16; B30B 9/26; B30B 15/0082;
(Continued)

(56) References Cited

U.S. PATENT DOCUMENTS 5,193,446 A * 3/1993 Olusczak .................. B30B 9/12
210/143

FOREIGN PATENT DOCUMENTS

JP          63-11198 U    1/1988
JP          06292997 A  * 10/1994 ............. B30B 9/166

* cited by examiner

*Primary Examiner* — Jimmy T Nguyen
(74) *Attorney, Agent, or Firm* — Greenblum & Bernstein, P.L.C.

(57) ABSTRACT

A washing pipe is mounted on a washing guide provided on an outer side of an outer cylinder screen of the screw press and includes a washing pipe body and washing nozzles provided in the washing pipe body and configured to discharge washing liquid flowing from an inside of the washing pipe body toward the outer cylinder screen. A washing pipe swing supporter is configured to support the washing guide to allow the washing pipe to swing between a discharge position and a separation position. The discharge position is a position where the washing pipe is mounted on the washing guide and the washing liquid is discharged from the washing nozzles toward the outer cylinder screen. The separation position is a position where the washing nozzles are farther away from the outer cylinder screen than in a state where the washing pipe is positioned at the discharge position.

6 Claims, 10 Drawing Sheets

(51) Int. Cl.
 *B30B 9/14* (2006.01)
 *B30B 15/00* (2006.01)
 *C02F 11/125* (2019.01)
(52) U.S. Cl.
 CPC ........ *B30B 15/0082* (2013.01); *C02F 11/125* (2013.01); *B01D 2201/084* (2013.01); *C02F 2303/16* (2013.01)
(58) Field of Classification Search
 CPC .............. B01D 29/6446; B01D 29/117; B01D 2201/084; C02F 11/125; C02F 2103/20; C02F 2303/16; B04B 1/20
 USPC .......................... 100/117, 126, 127, 128, 129
 See application file for complete search history.

FIG.1
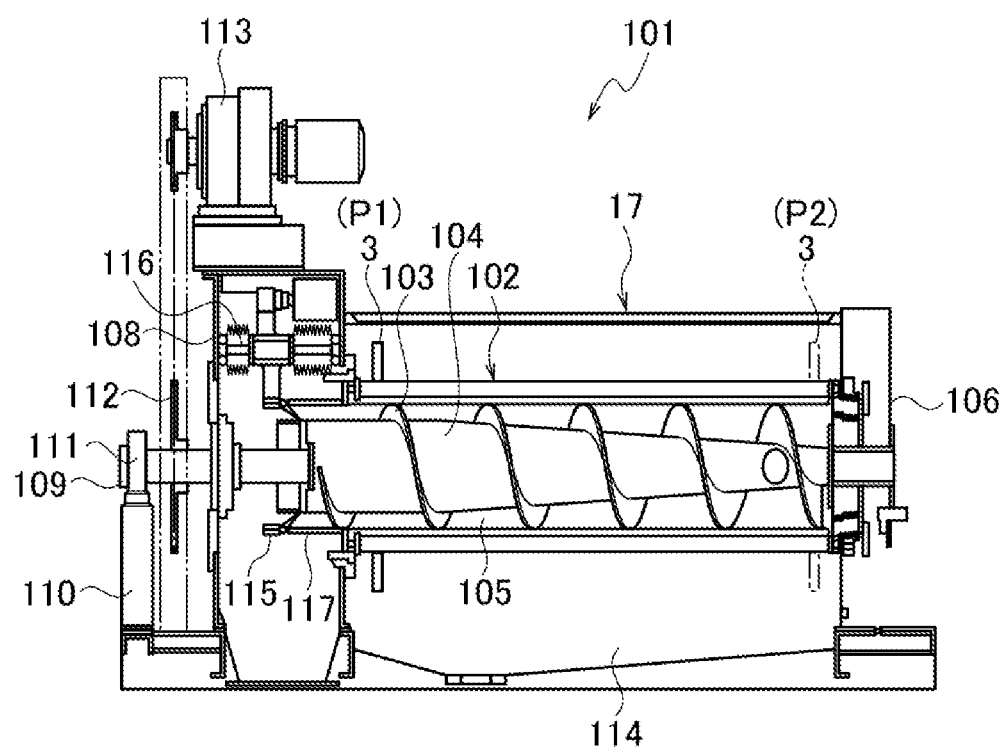
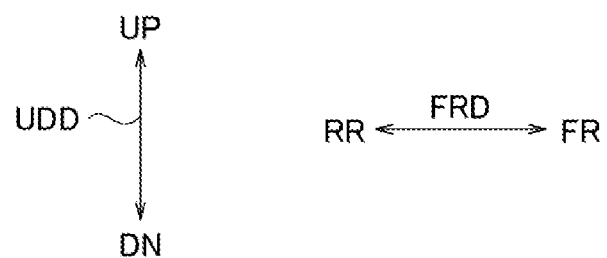

OUTER CYLINDER SCREEN WASHING APPARATUS OF SCREW PRESS

CROSS REFERENCE TO RELATED APPLICATION

The present application is based on, and claims priority from the prior Japanese Patent Application No. 2021-151728, filed on Sep. 17, 2021, the entire contents of which are incorporated herein by reference.

BACKGROUND

1. Technical Field

The disclosure relates to an outer cylinder screen washing apparatus of a screw press.

2. Related Art

Japanese Unexamined Utility Model Application Publication No. Sho 63-11198 describes a screw press in which washing nozzles of a washing pipe are annularly arranged and an outer cylinder screen is washed by jetting washing water from the washing nozzles of the washing pipe toward the outer periphery of the outer cylinder screen.

SUMMARY

In the screw press above, the washing nozzles mounted on the leading end of the washing pipe may be blocked (clogged) due to adherence of filtration liquid scattered during operation and by dust in the washing pipe or the like.

Thus, it is necessary to periodically dismount and wash the washing nozzles. Since the washing pipe has an annular shape, mounting and dismounting of the washing nozzles adjacent to the outer cylinder screen takes time and effort depending on the size of the screw press and the environment of the place where the screw press is installed.

It may be necessary to take apart the outer cylinder screen, a screw shaft, or the like when dismounting the washing pipe. This requires an enormous expense and a great number of work days.

The disclosure is directed to an outer cylinder screen washing apparatus of a screw press in which washing nozzles can be easily dismounted.

An outer cylinder screen washing apparatus of a screw press in accordance with some embodiments includes: a washing guide provided on an outer side of an outer cylinder screen of the screw press; a washing pipe mounted on the washing guide and including a washing pipe body and washing nozzles provided in the washing pipe body, the washing nozzles configured to discharge washing liquid flowing from an inside of the washing pipe body toward the outer cylinder screen; and a washing pipe swing supporter configured to support the washing guide to allow the washing pipe to swing between a discharge position and a separation position, the discharge position being a position where the washing pipe is mounted on the washing guide and the washing liquid is discharged from the washing nozzles toward the outer cylinder screen, the separation position being a position where the washing nozzles are farther away from the outer cylinder screen than in a state where the washing pipe is positioned at the discharge position.

The outer cylinder screen washing apparatus of a screw press above may further include a washing guide mover configured to move the washing guide together with the washing pipe in an extension direction of a central axis of the outer cylinder screen with the washing pipe being positioned at the discharge position. Upon the washing pipe swinging, the washing pipe may be supported, via a hinge included in the washing pipe swing supporter, by a frame which supports the outer cylinder screen.

The washing pipe body may have a semicircular arc shape. A position of a center portion of the washing pipe body and a position of a center portion of the outer cylinder screen may coincide with each other in an up-down direction. The washing pipe swing supporter may be configured to allow the washing pipe to swing with respect to the outer cylinder screen about a swing central axis extending in the up-down direction as a swing center with the center portion of the washing pipe body being engaged with the hinge.

The washing guide may include a first washing guide having a semicircular arc shape and a second washing guide having a semicircular arc shape. The first washing guide and the second washing guide connected to each other at connection sites may form an annular shape. One of the connection sites may be positioned at upper ends of the first and second washing guides and the other of the connection sites may be positioned at lower ends of the first and second washing guides. The washing pipe may include a first washing pipe with a first washing pipe body having a semicircular arc shape and a second washing pipe with a second washing pipe body having a semicircular arc shape. With the first washing pipe and the second washing pipe being positioned at the discharge position, the semicircular arc shape of the first washing pipe body may overlap the semicircular arc shape of the first washing guide and the semicircular arc shape of the second washing pipe body may overlap the semicircular arc shape of the second washing guide in the extension direction.

The washing guide mover may include a rail and a washing guide supporter. The rail may extend in a front-rear direction to be apart from the washing guide above the washing guide. A lower end of the washing guide supporter may be provided in the washing guide. An upper portion of the washing guide supporter may protrude upward from the washing guide. Engagement of an upper end of the washing guide supporter with the rail may enable the washing guide and the washing pipe to move in the extension direction with the washing pipe being positioned at the discharge position.

The washing guide may include a positioning portion for positioning the washing pipe with respect to the washing guide upon mounting of the washing pipe on the washing guide.

According to the aforementioned configuration, it is possible to easily dismount washing nozzles in an outer cylinder screen washing apparatus of a screw press.

BRIEF DESCRIPTION OF DRAWINGS

FIG. 1 is a view illustrating a schematic configuration of a screw press in which an outer cylinder screen washing apparatus of a screw press according to an embodiment of the present invention is installed and used.

Figure 2:
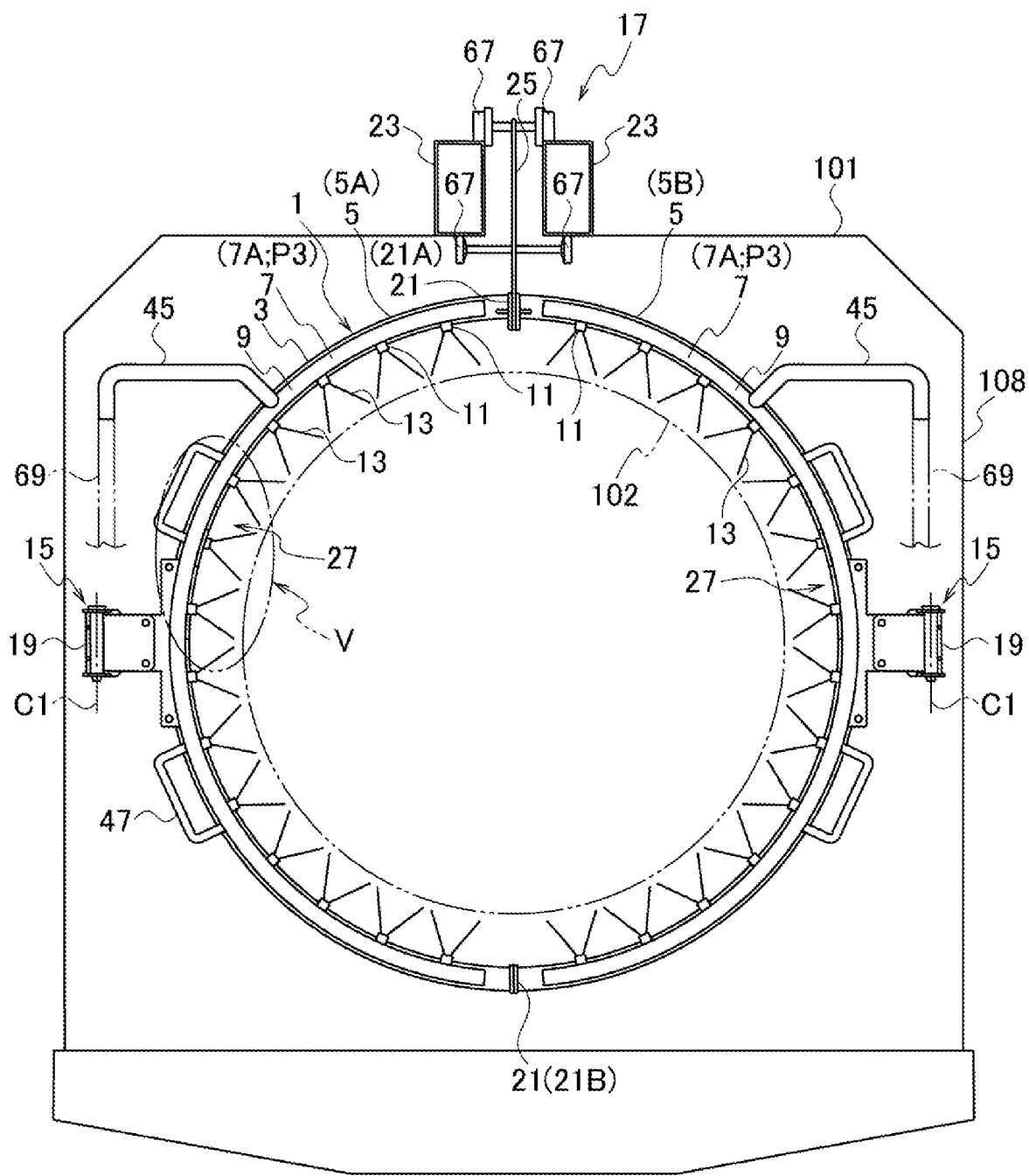
FIG. 2 is a view of the outer cylinder screen washing apparatus of a screw press according to the embodiment viewed in the front-rear direction.
Figure 3:
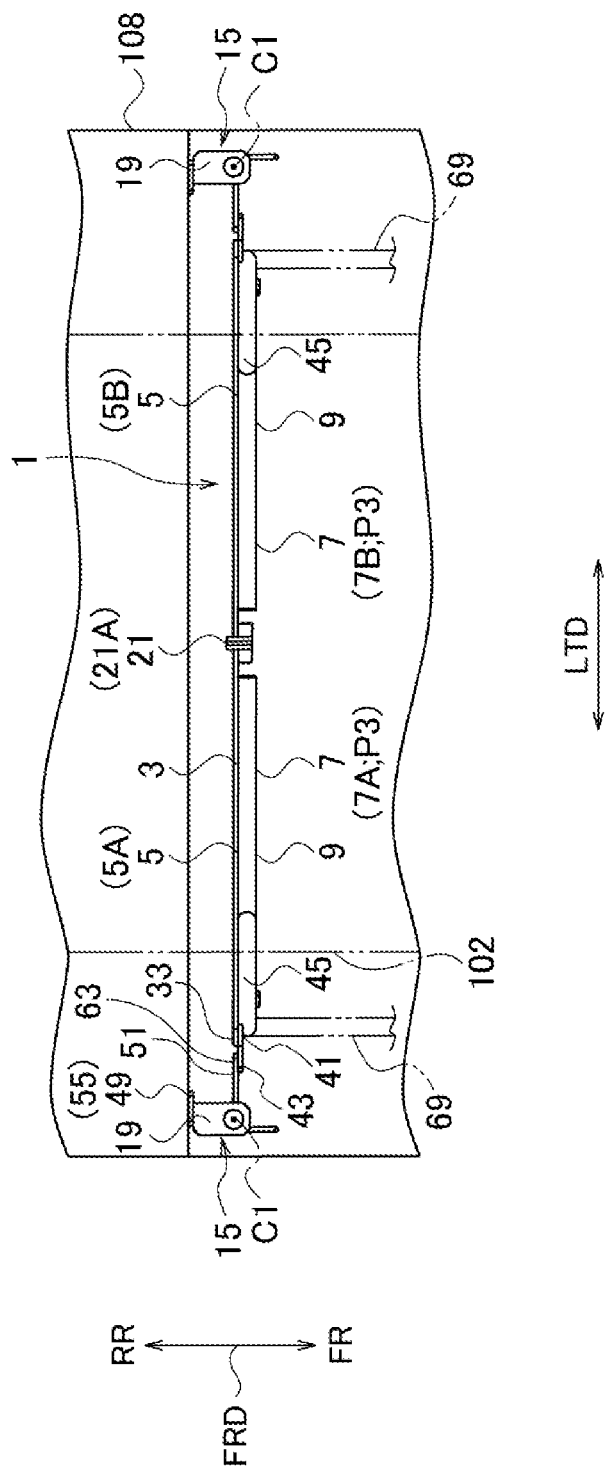
FIG. 3 is a view of the outer cylinder screen washing apparatus of a screw press according to the embodiment viewed in the up-down direction in the state where a washing pipe is positioned at a discharge position.
Figure 4:
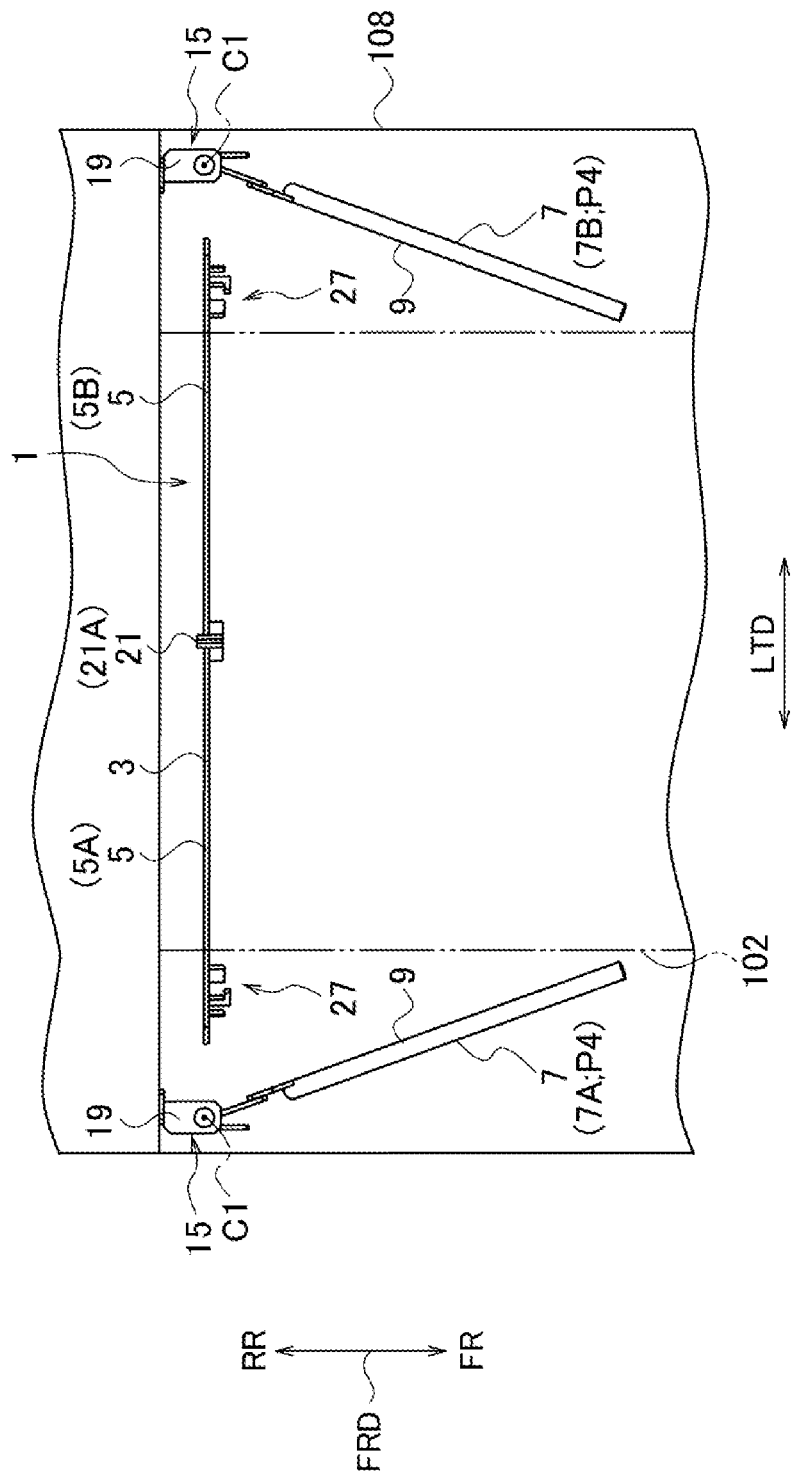
FIG. 4 is a view of the outer cylinder screen washing apparatus of a screw press according to the embodiment viewed in the up-down direction in the state where the washing pipe is positioned at a separation position.
Figure 5:
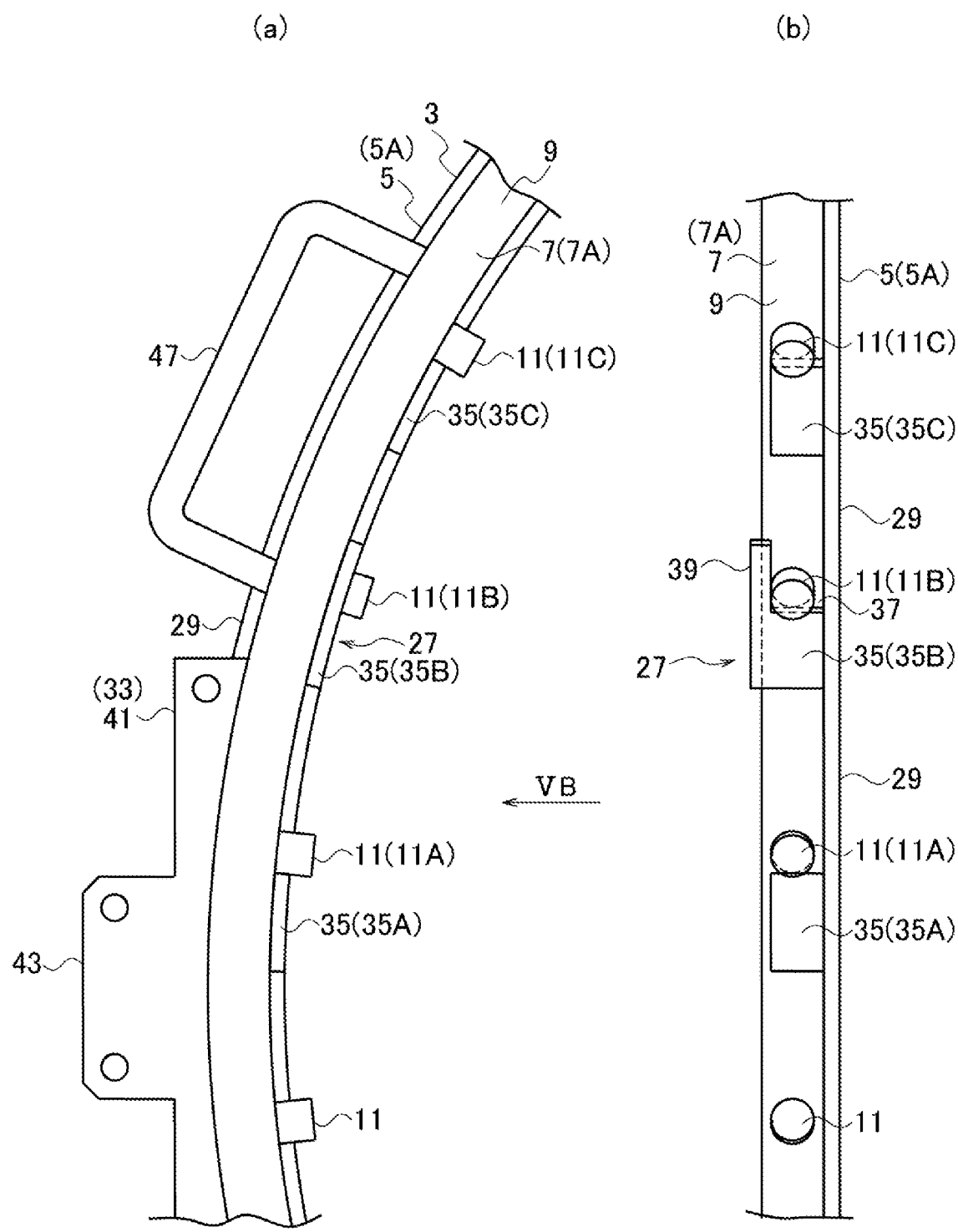

The part (a) of FIG. 5 is an enlarged view of the area V in FIG. 2 and the part (b) of FIG. 5 is an arrow view seen from the direction VB in the part (a) of FIG. 5.

Figure 6:
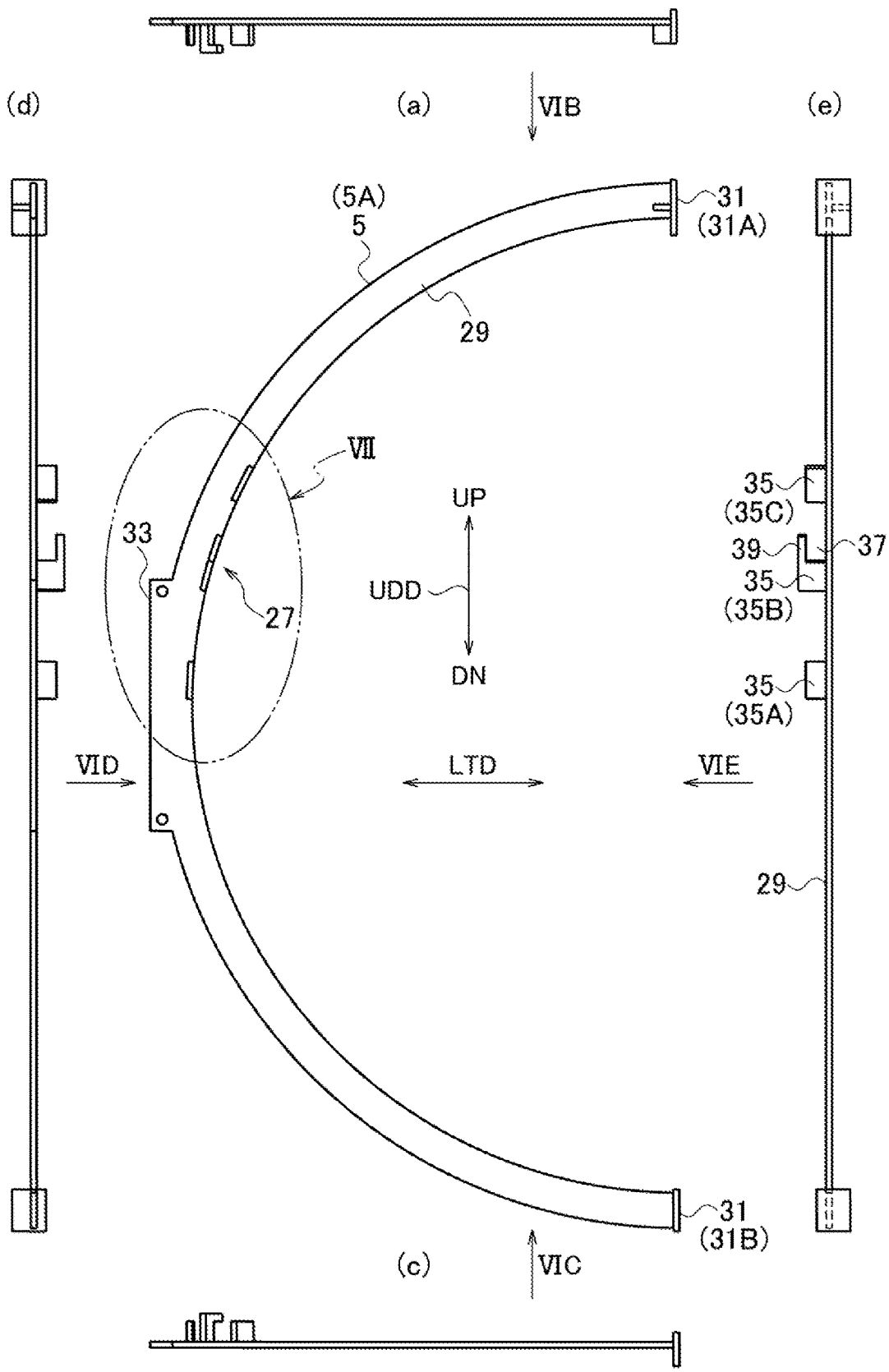

The part (a) of FIG. 6 illustrates a washing guide of the outer cylinder screen washing apparatus of a screw press according to the embodiment, the part (b) of FIG. 6 is an arrow view seen from the direction VIB in the part (a) of FIG. 6, the part (c) of FIG. 6 is an arrow view seen from the direction VIC in the part (a) of FIG. 6, the part (d) of FIG. 6 is an arrow view seen from the direction VID in the part (a) of FIG. 6, and the part (e) of FIG. 6 is an arrow view seen from the direction VIE in the part (a) of FIG. 6.

Figure 7:
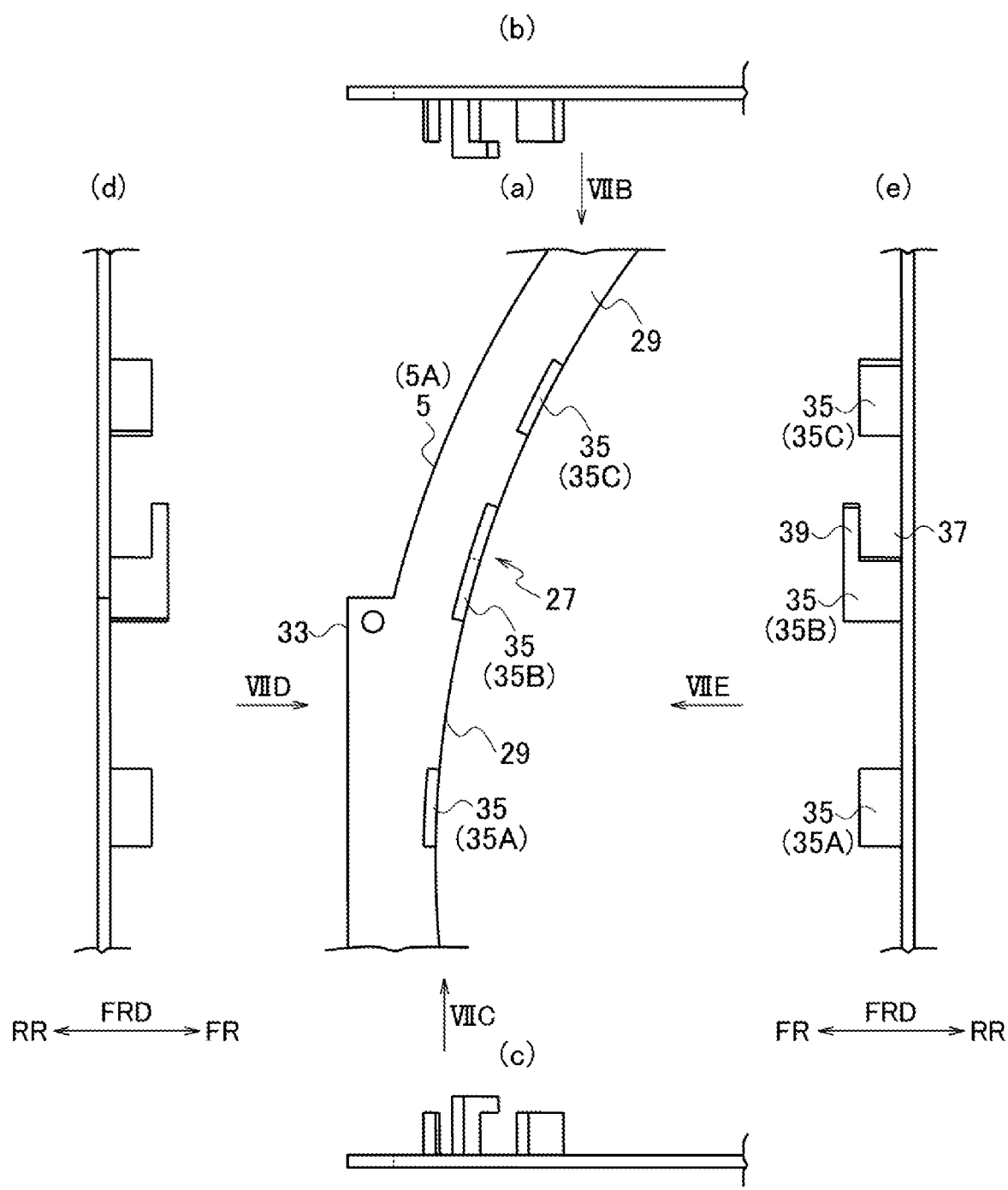

The part (a) of FIG. 7 is an enlarged view of the area VII in the part (a) of FIG. 6, the part (b) of FIG. 7 is an arrow view seen from the direction VIIB in the part (a) of FIG. 7, the part (c) of FIG. 7 is an arrow view seen from the direction VIIC in the part (a) of FIG. 7, the part (d) of FIG. 7 is an arrow view seen from the direction VIID in the part (a) of FIG. 7, and the part (e) of FIG. 7 is an arrow view seen from the direction VIIE in the part (a) of FIG. 7.

Figure 8:
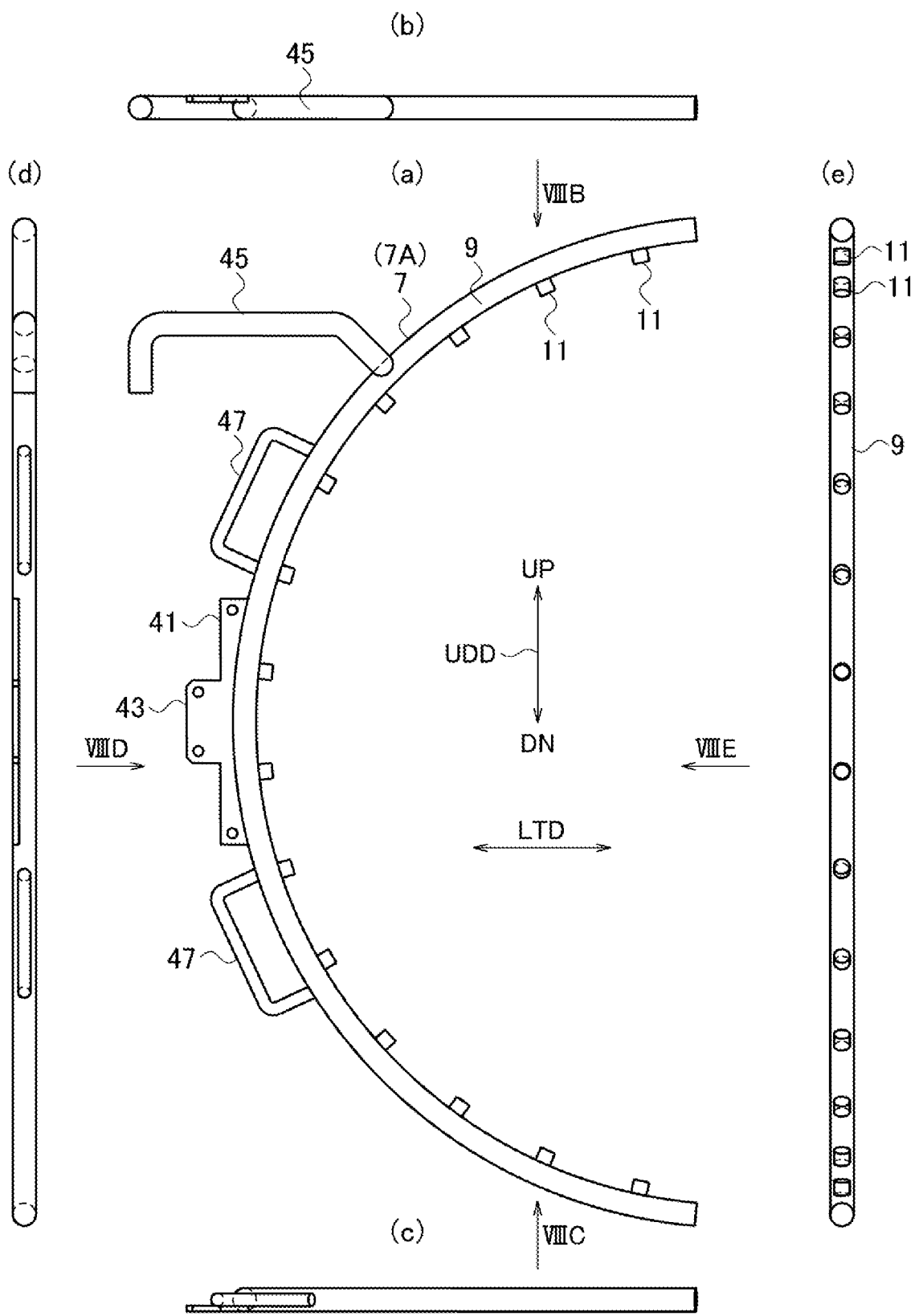

The part (a) of FIG. 8 illustrates the washing pipe of the outer cylinder screen washing apparatus of a screw press according to the embodiment, the part (b) of FIG. 8 is an arrow view seen from the direction VIIIB in the part (a) of FIG. 8, the part (c) of FIG. 8 is an arrow view seen from the direction VIIIC in the part (a) of FIG. 8, the part (d) of FIG. 8 is an arrow view seen from the direction VIIID in the part (a) of FIG. 8, and the part (e) of FIG. 8 is an arrow view seen from the direction VIIIE in the part (a) of FIG. 8.

Figure 9:
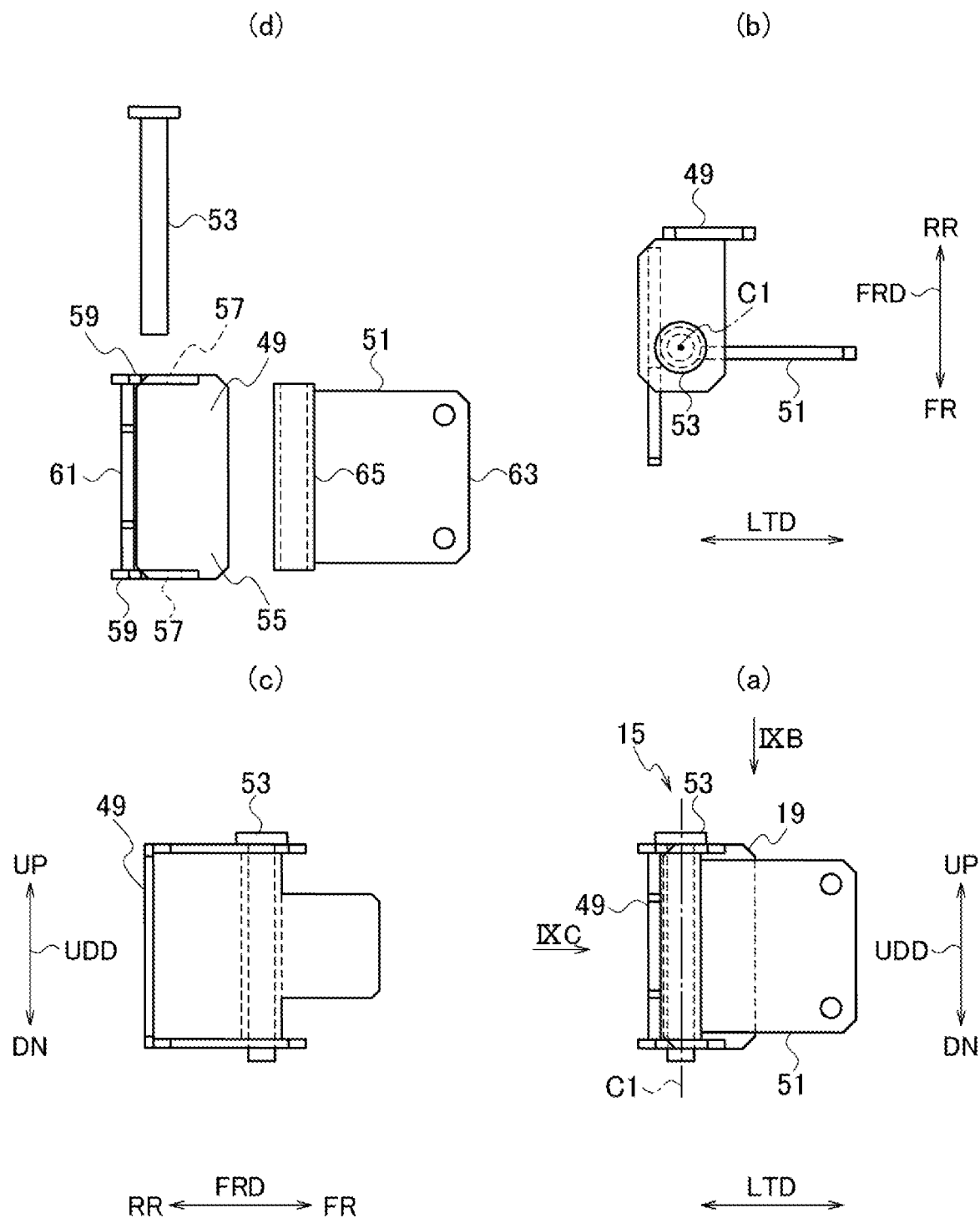

The part (a) of FIG. 9 illustrates a hinge of the outer cylinder screen washing apparatus of a screw press according to the embodiment, the part (b) of FIG. 9 is an arrow view seen from the direction IXB in the part (a) of FIG. 9, the part (c) of FIG. 9 is an arrow view seen from the direction IXC in the part (a) of FIG. 9, and the part (d) of FIG. 9 is an exploded view of the hinge.

Figure 10:
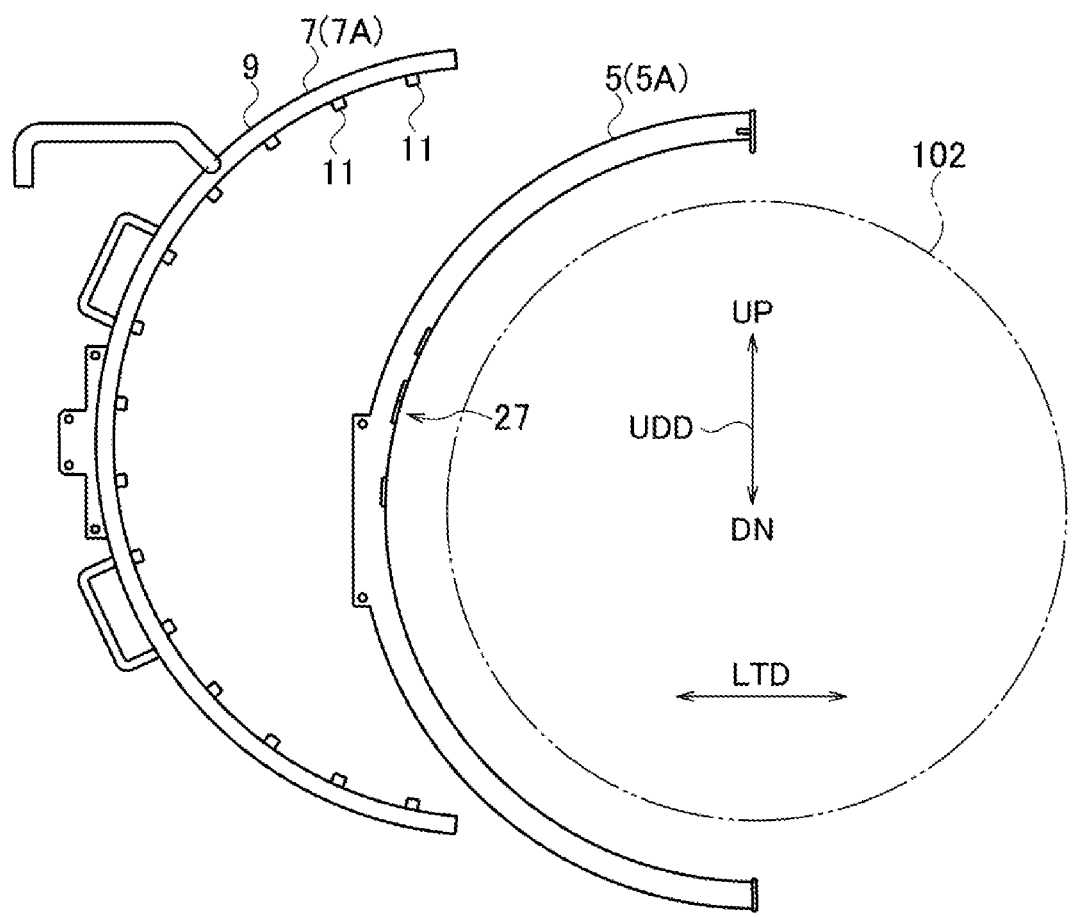

FIG. 10 is a view for explaining mounting of the washing pipe on the washing guide in the outer cylinder screen washing apparatus of a screw press according to the embodiment.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Description will be hereinbelow provided for embodiments of the present invention by referring to the drawings. It should be noted that the same or similar parts and components throughout the drawings will be denoted by the same or similar reference signs, and that descriptions for such parts and components will be omitted or simplified. In addition, it should be noted that the drawings are schematic and therefore different from that in reality.

First, a description will be hereinbelow provided by referring to FIG. 1 for a screw press (dehydrating apparatus) 101 in which an outer cylinder screen washing apparatus of a screw press (hereinafter referred to as a screen washing apparatus) 1 according to an embodiment of the present invention is used. The screw press 101 is an apparatus used for processing sludge. In FIGS. 1 to 4 and 6 to 10, the directions of up, down, front, rear, up-down, front-rear, and lateral are denoted by UP, DN, FR, RR, UDD, FRD, and LTD, respectively. UDD (up-down direction) and LTD (lateral direction) in FIG. 6 indicate the directions for the part (a) of FIG. 6. UDD (up-down direction) and LTD (lateral direction) in FIG. 8 indicate the directions for the part (a) of FIG. 8.

The screw press 101 includes an outer cylinder screen 102 having a filtration surface on the periphery, and a screw shaft 104 provided inside the outer cylinder screen 102 and having a screw vane 103 wound therearound. The screw shaft 104 expands in the up-down direction from the supply side for sludge toward the discharge side for the cake (from the front side toward the rear side). A filtration chamber 105 between the outer cylinder screen 102 and the screw shaft 104 shrinks in the up-down direction from the supply side toward the discharge side.

A description will be provided for the configuration of the screw press 101 at the supply side. In the screw press 101, the screw shaft 104 has a supply path for flocculated slurry, a supply opening opens at the starting end of the filtration chamber 105, and an extended portion of the screw shaft 104 and a thickened sludge supply pipe (not illustrated) are connected to each other. The screw press 101 is configured such that thickened sludge press-fitted into the filtration chamber 105 from the supply opening is supplied from the space defined by the screw vane 103 wound around the screw shaft 104, and thickened sludge such as flocculated soft sludge can be unaffected by the screw vane 103.

A description will be provided for the configuration of the screw press 101 at the discharge side. In the screw press 101, a rotation plate connected to the discharge side of the outer cylinder screen 102 is supported on a frame 108, and a screw drive shaft 109 is connected to the screw shaft 104 provided inside the outer cylinder screen 102. A presser 115 for back pressure adjustment provided against a discharge outlet 117 of the filtration chamber 105 is slidably supported on a movement shaft 116 provided on the frame 108.

The screw drive shaft 109 connected to the screw shaft 104 is axially supported on a bearing 111 provided on a pedestal 110 of the frame 108. The screw drive shaft 109 is cooperatively connected with a screw driver 113 placed on the frame 108 via a sprocket 112 attached to the screw drive shaft 109. The screw driver 113 of the screw shaft 104 is operated, thickened sludge is supplied to the filtration chamber 105 from the supply opening of the screw shaft 104, and filtration liquid is separated from the outer cylinder screen 102 while the thickened sludge is being transferred by the screw vane 103.

The opening amount of the discharge outlet 117 of the filtration chamber 105 is adjusted with the presser 115 and dehydrated cake is discharged while the back pressure is added to the filtration chamber 105 to promote the solid-liquid separation. A filtration liquid trough 114 is provided below the outer cylinder screen 102. There is provided a cake receiver which is adjacent to the filtration liquid trough 114 at the finishing end of the screw press 101 and which receives and stores the dehydrated cake.

For illustration purposes, a prescribed direction which is horizontal in the screen washing apparatus 1 (screw press 101) is assumed to be the front-rear direction, a prescribed direction which is horizontal and perpendicular to the front-rear direction is assumed to be the lateral direction, and a direction which is perpendicular to the front-rear direction and the lateral direction is assumed to be the up-down direction.

As illustrated in FIG. 2, the screen washing apparatus 1 includes a screen washing apparatus body 3 which is generally formed in an annular shape. As illustrated in FIG. 1, the screen washing apparatus body 3 is provided in the screw press 101 in the manner that the outer cylinder screen 102 having a cylindrical shape penetrates through the annular shape of the screen washing apparatus body 3. The screen washing apparatus body 3 is movable in the front-rear direction along the entire length of the outer cylinder screen 102. Specifically, the screen washing apparatus body 3 is movable between the position P1 denoted by the solid line in FIG. 1 and the position P2 denoted by the chain double-dashed line in FIG. 1.

As illustrated in FIG. 2 and other drawings, the screen washing apparatus body 3 includes a washing guide (washing pipe supporter) 5 and a washing pipe 7. The washing guide 5 is provided slightly away from the outer cylinder screen 102 of the screw press 101 having a cylindrical shape at the outer side of the outer cylinder screen 102.

The washing pipe 7 is mounted on the washing guide 5 at the outer side of the outer cylinder screen 102. The washing pipe 7 includes a washing pipe body 9 and washing nozzles 11. The washing nozzles 11 are provided in the washing pipe body 9 and are capable of discharging (jetting) washing liquid 13 which flows from the inside of the washing pipe body 9 toward the outer cylinder screen 102.

The screen washing apparatus 1 includes a washing pipe swing supporter (washing pipe rotation supporter) 15. The washing pipe swing supporter 15 supports the washing pipe 7. The supported washing pipe 7 is capable of swinging from a discharge position P3 (see FIGS. 2 and 3) toward a separation position P4 (see FIG. 4).

When the washing pipe 7 is positioned at the discharge position P3, the washing pipe 7 is integrally mounted on the washing guide 5 in order to wash the outer cylinder screen 102 and discharges the washing liquid 13 (see FIG. 2) from the washing nozzles 11 toward the outer cylinder screen 102.

When the washing pipe 7 is positioned at the separation position P4, the washing nozzles 11 of the washing pipe 7 are farther away from the outer cylinder screen 102 than in the state where the washing pipe 7 is positioned at the discharge position P3 in order to facilitate dismounting of the washing nozzles 11 from the washing pipe body 9 and cleaning of the washing nozzles 11.

Specifically, the washing pipe 7 is capable of swinging (rotating) with respect to the washing guide 5 and the outer cylinder screen 102 by means of the washing pipe swing supporter 15 about a prescribed swing central axis (prescribed swing central axis extending in the up-down direction, for example) Cl as the swing center.

When the washing pipe 7 is being swung by means of the washing pipe swing supporter 15 and when the washing pipe 7 is positioned at the separation position P4, the washing pipe 7 is away (separated) from the washing guide 5.

The washing pipe 7 is located at the outer side of the outer cylinder screen 102 and away from the outer cylinder screen 102 in any of the states where the washing pipe 7 is positioned at the discharge position P3, where the washing pipe 7 is positioned at the separation position P4, and where the washing pipe 7 is being swung by means of the washing pipe swing supporter 15.

The screen washing apparatus 1 includes a washing guide mover 17 (see FIGS. 1 and 2). The washing guide mover 17 is capable of moving the washing guide 5 together with the washing pipe 7 in the extension direction of the central axis (front-rear direction) of the outer cylinder screen 102 in the state where the washing pipe 7 is positioned at the discharge position P3. Specifically, the washing guide mover 17 is capable of moving the screen washing apparatus body 3 between the position (rear end position) P1 denoted by the solid line in FIG. 1 and the position (front end position) P2 denoted by the chain double-dashed line in FIG. 1 in the state where the washing pipe 7 is positioned at the discharge position P3.

When the washing guide 5 and the washing pipe 7 are being moved by the washing guide mover 17, the washing liquid 13 is discharged from the washing nozzles 11 to wash the outer cylinder screen 102. As illustrated in FIG. 2, when the outer cylinder screen 102 is being washed, each of discharge openings of the washing nozzles 11 for the washing liquid 13 is slightly away from and faces the outer cylinder screen 102. When the outer cylinder screen 102 is being washed, the distance between each of the discharge openings of the washing nozzles 11 for the washing liquid 13 and the outer cylinder screen 102 (distance in the radial direction of the outer cylinder screen 102) is constant.

In the screen washing apparatus 1, when the washing pipe 7 swings with respect to the washing guide 5 and when the washing pipe 7 is positioned at the separation position P4, the washing guide 5 and the washing pipe 7 are positioned at a prescribed position in the front-rear direction by means of the washing guide mover 17. The prescribed position in the front-rear direction is the rear position P1 (see FIG. 1), for example.

As described above, when the washing pipe 7 swings and when the washing pipe 7 is positioned at the separation position P4, the washing pipe 7 is in the state of being dismounted from the washing guide 5 and thus being away from the washing guide 5.

Further, when the washing pipe 7 swings and when the washing pipe 7 is positioned at the separation position P4, the washing pipe 7 is supported by the frame 108 which supports the outer cylinder screen 102, via a hinge 19 included in the washing pipe swing supporter 15.

The washing pipe body 9 has a semicircular arc shape (specifically, slightly shorter than a semicircular arc). The upper end of the washing pipe body 9 is positioned above the outer cylinder screen 102 and the lower end of the washing pipe body 9 is positioned below the outer cylinder screen 102 in the up-down direction. The position of the center portion of the washing pipe 7 (the washing pipe body 9) and the position of the center portion of the outer cylinder screen 102 coincide with each other in the up-down direction.

In the washing pipe swing supporter 15, the center portion of the washing pipe body 9 is engaged with the hinge 19 such that the washing pipe 7 (the washing pipe body 9) is capable of swinging with respect to the outer cylinder screen 102 about the prescribed swing central axis Cl extending in the up-down direction as the swing center.

As illustrated in FIG. 2, the washing guide 5 is provided as a pair each having a semicircular arc shape. The pair of washing guides 5 has an annular shape with the washing guides 5 (5A, 5B) being connected to each other.

A connection site 21A which is one of two connection sites 21 of the pair of washing guides 5 is positioned at the upper end of the washing guide 5. A connection site 21B which is the other of the two connection sites 21 of the pair of washing guides 5 is positioned at the lower end of the washing guide 5.

As illustrated in FIG. 2, the washing pipe 7 is also provided as a pair each having a substantially semicircular arc shape. As illustrated in FIG. 2, when the pair of washing pipes 7 (7A, 7B) is positioned at the discharge position P3, the semicircular arc shapes of the washing pipe bodies 9 of the pair of washing pipes 7 respectively overlap the semicircular arc shapes of the pair of washing guides 5 in a view of the front-rear direction.

The center of the circle of the pair of washing guides (5A, 5B) having an annular shape and the center of the circle of the outer cylinder screen 102 coincide with each other in a view of the front-rear direction. The centers of the semicircular arc shapes of the washing pipe bodies 9 of the pair of washing pipes 7 and the center of the circle of the outer cylinder screen 102 coincide with each other in a view of the front-rear direction in the state where the pair of washing pipes 7 is positioned at the discharge position P3.

As illustrated in FIG. 2, the washing guide mover 17 includes rails 23 and a washing guide supporter 25. The rails 23 extend in the front-rear direction to be apart from the washing guide 5 above the washing guide 5.

The lower end of the washing guide supporter 25 is integrally provided in the washing guide 5 and the upper portion of the washing guide supporter 25 protrudes upward from the washing guide 5.

Due to engagement of the upper end of the washing guide supporter 25 with the rails 23, the washing guide 5 and the washing pipe 7 suspended from the upper end of the washing guide supporter 25 are movable in the extension direction of the central axis (front-rear direction) of the outer cylinder screen 102 in the state where the washing pipe 7 is positioned at the discharge position P3.

As illustrated in FIGS. 5 to 7, the washing guide 5 includes a positioning portion 27 for positioning the washing pipe 7 with respect to the washing guide 5 when the washing pipe 7 is mounted on the washing guide 5 (when the washing pipe 7 is mounted on the washing guide 5 and positioned in the discharge position P3). The positioning portion 27 may be omitted when the outer cylinder screen washing apparatus of a screw press 1 is small.

The screen washing apparatus 1 will be described in more detail.

As illustrated in FIGS. 6 and 7, the washing guide 5 includes a washing guide body 29, washing guide connection portions 31, and a washing guide engagement portion (fixing seat for washing pipe) 33, in addition to the positioning portion (washing pipe positioning portion) 27 described above.

The washing guide body 29 has a semicircular arc shape with a prescribed width in a view of the front-rear direction. The width direction of the washing guide body 29 coincides with the radial direction of the semicircular arc shape of the washing guide body 29. The washing guide body 29 has a prescribed thickness. The thickness direction of the washing guide body 29 coincides with the front-rear direction. The width dimension of the washing guide body 29 is greater than the thickness dimension of the washing guide body 29.

Each of the washing guide connection portions 31 has a rectangular flat plate shape. The thickness direction of each of the washing guide connection portions 31 is the lateral direction. One washing guide connection portion 31A of the washing guide connection portions 31 is integrally provided in the washing guide body 29 at the upper end of the washing guide body 29. The other washing guide connection portion 31B of the washing guide connection portions 31 is integrally provided in the washing guide body 29 at the lower end of the washing guide body 29.

As illustrated in FIG. 2, connection of one washing guide 5A with the other washing guide 5B is performed by connecting the washing guide connection portion 31A of the washing guide 5A with the washing guide connection portion 31A of the washing guide 5B and by connecting the washing guide connection portion 31B of the washing guide 5A with the washing guide connection portion 31B of the washing guide 5B. As a result of the connection, the pair of washing guide (5A, 5B) becomes an annular shape as illustrated in FIG. 2.

For connection of the washing guide connection portion 31A of the washing guide 5A with the washing guide connection portion 31A of the washing guide 5B, the washing guide supporter 25 is sandwiched between the washing guide connection portions 31A. For connection of the washing guide connection portion 31B of the washing guide 5A with the washing guide connection portion 31B of the washing guide 5B, the washing guide connection portions 31B are in direct contact with each other.

The connection of the washing guide 5A with the washing guide 5B is performed with non-illustrated fastening members such as bolts, nuts, or the like.

As illustrated in FIG. 6, the washing guide engagement portion 33 has a rectangular shape which is elongate in the up-down direction in a view of the front-rear direction. The washing guide engagement portion 33 is formed in the manner that a part of the washing guide body 29 protrudes in the lateral direction. The washing guide engagement portion 33 is positioned at the center portion of the washing guide body 29 in the up-down direction. The washing guide engagement portion 33 protrudes toward the side away from the center of the semicircular arc shape of the washing guide body 29.

The positioning portion 27 is formed of a rectangular flat plate shaped member 35, for example. The rectangular flat plate shaped member 35 is provided in plurality (three, for example) on one washing guide 5 (one washing guide body 29). The thickness direction of the rectangular flat plate shaped member 35 is the radial direction of the semicircular arc shape of the washing guide body 29. The rectangular flat plate shaped member 35 is provided on the edge of the washing guide body 29 which is near the center of the semicircular arc shape of the washing guide body 29 in the width direction of the washing guide body 29. The rectangular flat plate shaped member 35 protrudes forward in the front-rear direction from the washing guide body 29.

The first rectangular flat plate shaped member 35A is positioned slightly above the center of the semicircular arc shape of the washing guide body 29 in the up-down direction (the center in the extension direction of the semicircular arc shape). The second rectangular flat plate shaped member 35B is positioned slightly above and away from the first rectangular flat plate shaped member 35A in the up-down direction. The third rectangular flat plate shaped member 35C is positioned slightly above and away from the second rectangular flat plate shaped member 35B in the up-down direction.

All of the rectangular flat plate shaped members 35A, 35B, and 35C are positioned near the center of the semicircular arc shape of the washing guide body 29 in the up-down direction.

As illustrated in FIG. 7, the forward protrusion amount of the second rectangular flat plate shaped member 35B is greater than the forward protrusion amount of each of the first and third rectangular flat plate shaped members 35A, 35C. The second rectangular flat plate shaped member 35B includes a rectangular recess 37. The recess 37 is concave downward from the upper end of the second rectangular flat plate shaped member 35B in the up-down direction, and positioned at the side of the washing guide body 29 in the front-rear direction (at the rear side of the second rectangular flat plate shaped member 35B). Thus, the second rectangular flat plate shaped member 35B is formed in an L-shape with a reverse portion 39.

The reverse portion 39 suppresses separation of a washing nozzle 11B from the washing guide 5. Engagement of a first washing pipe engagement portion 41 of the washing pipe 7 with the washing guide engagement portion 33 of the washing guide 5 is released in the state where the washing pipe 7 is positioned at the discharge position P3. Thus, the washing pipe 7 is separated from the washing guide 5 by moving the washing pipe 7 in the side direction or in the obliquely upward lateral direction with respect to the washing guide 5. The side direction is the lateral direction and the direction which is away from the outer cylinder screen 102.

The reverse portion 39 decreases the stress generated at the connection portions of the washing guide engagement portion 33 and the first washing pipe engagement portion 41 during the movement (particularly the acceleration and deceleration movement) of the screen washing apparatus body 3 in the front-rear direction.

As illustrated in FIG. 8, the washing pipe 7 includes the first washing pipe engagement portion (fixing seat for washing) 41, a second washing pipe engagement portion (mounting seat for swinging) 43, a washing liquid supply pipe 45, and handles 47, in addition to the washing pipe body 9 and the washing nozzles 11.

As illustrated in FIG. 2 and other drawings, the washing pipe body 9 is a cylindrical member which is closed at both ends and bent into a semicircular arc shape. The washing nozzles 11 are arranged at a prescribed interval on the washing pipe body 9 in the extension direction of the washing pipe body 9. The washing nozzles 11 protrude from the washing pipe body 9 toward the center of the semicircular arc shape of the washing pipe body 9. Each of the washing nozzles 11 discharges the washing liquid 13 with a prescribed solid angle toward the center of the semicircular arc shape of the washing pipe body 9.

The first washing pipe engagement portion 41 and the second washing pipe engagement portion 43 are formed as a single unit in a flat plate shape. The thickness direction of the first washing pipe engagement portion 41 and the second washing pipe engagement portion 43 is the front-rear direction. The first washing pipe engagement portion 41 has substantially the same shape as the shape of the washing guide engagement portion 33 of the washing guide 5. The second washing pipe engagement portion 43 has a rectangular shape whose dimension in the up-down direction is smaller than the dimension of the first washing pipe engagement portion 41 in the up-down direction.

The second washing pipe engagement portion 43 protrudes from the first washing pipe engagement portion 41 away from the center of the semicircular arc shape of the washing pipe body 9. The second washing pipe engagement portion 43 is positioned at the center portion of the first washing pipe engagement portion 41 in the up-down direction.

Since the first washing pipe engagement portion 41 is connected to the washing pipe body 9, the first washing pipe engagement portion 41 and the second washing pipe engagement portion 43 are integrally installed on the washing pipe body 9. The first washing pipe engagement portion 41 and the second washing pipe engagement portion 43 are arranged at the rear end of the washing pipe body 9 in the front-rear direction.

The washing liquid supply pipe 45 extends from the middle portion of the semicircular arc shape of the washing pipe body 9 to the outside of the washing pipe body 9 (the side away from the center of the semicircular arc shape of the washing pipe body 9). The handles 47 protrude from the middle portions of the semicircular arc shape of the washing pipe body 9 to the outside of the washing pipe body 9 (the side away from the center of the semicircular arc shape of the washing pipe body 9). The handles 47 are members for a worker to place the hands to swing the washing pipe 7.

As illustrated in FIGS. 2 and 5, the washing pipe body 9 is positioned at the inner side of the washing guide 5 in a view of the front-rear direction in the state where the washing pipe 7 is mounted on the washing guide 5. The first washing pipe engagement portion 41 of the washing pipe 7 overlaps the washing guide engagement portion 33 of the washing guide 5.

The washing guide 5 and the washing pipe 7 are connected to each other with bolts or the like at the site of the washing guide engagement portion 33 and the first washing pipe engagement portion 41. Thus, the washing guide and the washing pipe 7 are integrated and the washing pipe 7 is positioned at the discharge position P3.

The washing guide body 29 of the washing guide 5 and the washing pipe body 9 of the washing pipe 7 are in contact with each other in the state where the washing pipe 7 is positioned at the discharge position P3.

As illustrated in FIG. 5 and other drawings, the washing pipe body 9 and the washing nozzles 11A, 11B, 11C which are some of the washing nozzles 11 are in contact with the rectangular flat plate shaped member 35 in the state where the washing pipe 7 is positioned at the discharge position P3. The contact positions the washing pipe 7 with respect to the washing guide 5.

As illustrated in FIG. 5 and other drawings, one washing nozzle 11B is inserted in the recess 37 of the second rectangular flat plate shaped member 35B in the state where the washing pipe 7 is positioned at the discharge position P3. This also positions the washing pipe 7 with respect to the washing guide 5 and suppresses separation of the washing pipe 7 from the washing guide 5.

The hinge 19 included in the washing pipe swing supporter 15 has the configuration as illustrated in FIG. 9. Specifically, the hinge 19 includes a frame mounting member 49 which is integrally mounted on the frame 108 of the screw press 101, a washing pipe mounting member 51 on which the washing pipe 7 is integrally mounted, and a column-shaped pin 53.

The frame mounting member 49 includes a frame connection portion 55 to be connected to the frame 108, pin supporters 59 with circular through holes 57, and a stopper 61 which prevents the washing pipe 7 from swinging too much.

The washing pipe mounting member 51 includes a washing pipe connection portion 63 to be connected to the second washing pipe engagement portion 43 of the washing pipe 7, and a cylindrical pin supporter 65.

The frame mounting member 49 and the washing pipe mounting member 51 are placed such that the central axis of the through holes 57 of the frame mounting member 49 and the central axis of the pin supporter 65 of the washing pipe mounting member 51 coincide with each other, and then the pin 53 is inserted through the through holes 57 and the pin supporter 65. Thus, the washing pipe mounting member 51 is capable of swinging about the swing central axis Cl as the swing center with respect to the frame mounting member 49.

Mounting of the frame mounting member 49 on the frame 108 is performed using bolts or the like, and mounting of the washing pipe 7 on the washing pipe connection portion 63 is performed using bolts or the like. The leading end of the washing pipe connection portion 63 of the washing pipe mounting member 51 of the hinge 19 overlaps the second washing pipe engagement portion 43 of the washing pipe 7 in the state where the washing pipe 7 is mounted on the washing pipe connection portion 63.

When the screen washing apparatus body 3 is moved in the front-rear direction and the washing liquid 13 is discharged from the washing nozzles 11 to wash the outer cylinder screen 102 in the state where the washing pipe 7 is positioned at the discharge position P3, the hinge 19 is not mounted on but dismounted from the frame 108, for example.

When the screen washing apparatus body 3 is moved in the front-rear direction and the washing liquid 13 is discharged from the washing nozzles 11 to wash the outer cylinder screen 102 in the state where the washing pipe 7 is positioned at the discharge position P3, the hinge 19 may be mounted on the frame 108. In this configuration, the hinge 19 is folded and housed in the frame 108 so as not to interfere with the washing pipe 7 and others when the outer cylinder screen 102 is washed, for example.

When the washing pipe 7 is swung, the screen washing apparatus body 3 is moved rearward to be positioned at the rear end and then the hinge 19 is mounted on the frame 108. In the configuration where the hinge 19 is folded and housed in the frame 108, the hinge 19 is unfolded. Engagement of the first washing pipe engagement portion 41 of the washing pipe 7 with the washing guide engagement portion 33 of the washing guide 5 is released. Then, the second washing pipe engagement portion 43 of the washing pipe 7 is connected to the washing pipe connection portion 63 of the hinge 19. Thus, it becomes possible for the washing pipe 7 to swing to the separation position P4.

As illustrated in FIG. 2, the washing guide mover 17 includes the rails 23 supported on the frame 108, the washing guide supporter 25, rollers 67, and a non-illustrated actuator such as a motor.

The lower end of the washing guide supporter 25 is integrally mounted on the washing guide 5. The rollers 67 are provided on a prescribed portion of the upper portion of the washing guide supporter 25. The rollers 67 are rotatable with respect to the washing guide supporter 25. The rollers 67 form a rolling pair with respect to the rails 23. By rotating the motor, the rollers 67 are rotated by means of a chain drive or the like and the screen washing apparatus body 3 is moved in the front-rear direction. As the actuator, a cylinder or the like other than the motor may be used.

As illustrated in FIG. 2, the leading end of the washing liquid supply pipe 45 of the washing pipe 7 is connected to a flexible washing liquid supply pipe 69. Thus, the washing liquid 13 can be supplied to the washing pipe 7 even when the screen washing apparatus body 3 is being moved in the front-rear direction.

Next, a description will be provided for mounting of the washing pipe 7 on the washing guide 5 in the screen washing apparatus 1. The washing guide 5 is assumed to be mounted on the washing guide supporter 25 in the initial state.

In the initial state, as illustrated in FIG. 10, the washing pipe 7 is placed at a position obliquely upward from the washing guide 5, moved closer to the washing guide 5, and then mounted on the washing guide 5. Thus, one washing nozzle 11B is inserted in the recess 37 of the second rectangular flat plate shaped member 35B.

Next, a description will be provided for the maintenance or the like of the washing nozzles 11 in the screen washing apparatus 1.

In the initial state, the screen washing apparatus body 3 is moved in the front-rear direction and the washing liquid 13 is discharged from the washing nozzles 11 to wash the outer cylinder screen 102. Thus, the hinge 19 is dismounted from the frame 108 in the initial state.

In the initial state, the screen washing apparatus body 3 is moved rearward to be positioned at the rear end and then the hinge 19 is mounted on the frame 108.

Next, engagement of the first washing pipe engagement portion 41 of the washing pipe 7 with the washing guide engagement portion 33 of the washing guide 5 is released.

Next, the second washing pipe engagement portion 43 of the washing pipe 7 is connected to the washing pipe connection portion 63 of the hinge 19. Thus, it becomes possible for the washing pipe 7 to swing between the discharge position P3 and the separation position P4.

With the washing pipe 7 being kept positioned at the separation position P4, the washing nozzles 11 are dismounted from the washing pipe body 9 and cleaning of the washing nozzles 11 is performed in order to remove the clogging and the like of the washing nozzles 11.

The screen washing apparatus 1 includes the washing guide 5, the washing pipe 7, and the washing pipe swing supporter 15 which supports the washing pipe 7 to swing between the discharge position P3 and the separation position P4. The washing pipe 7 includes the washing pipe body 9 and the washing nozzles 11 which discharge the washing liquid 13, and the washing pipe 7 is mounted on the washing guide 5.

When the outer cylinder screen 102 has been washed in the screen washing apparatus 1, the washing nozzles 11 may be blocked (clogged) by filtration liquid of the outer cylinder screen 102 and the like. At this time, dismounting of the washing nozzles 11 from the washing pipe body 9 is facilitated by positioning the washing pipe 7 at the separation position P4 in which the washing nozzles 11 are away from the outer cylinder screen 102 by means of the washing pipe swing supporter 15. Further, the inspection and maintenance of the screen washing apparatus 1 such as washing of the washing nozzles 11 are facilitated.

Specifically, the washing pipe 7 can be positioned at the separation position P4 only by swinging the washing pipe 7 without dismounting the washing pipe 7 from the screw press 101. Thus, it is not necessary to dismount the washing pipe 7 out of the screw press 101 to dismount the washing nozzles 11 from the washing pipe body 9. It is also not necessary to perform the step of taking apart the screw shaft 104 of the screw press 101 and the like during the maintenance of the screen washing apparatus 1, and thus it is possible to reduce the expense and the number of work days required for the maintenance of the screen washing apparatus 1.

It is possible for a worker to directly dismount the washing nozzles 11 at the outside of the screw press 101 without entering into the screw press 101 during the maintenance of the screen washing apparatus 1.

In the screen washing apparatus 1, the washing guide is movable together with the washing pipe 7 by means of the washing guide mover 17 in the state where the washing pipe 7 is positioned at the discharge position P3. Thus, it is possible to reliably wash the entirety of the outer cylinder screen 102.

In the screen washing apparatus 1, the washing pipe 7 is supported on the frame 108 via the hinge 19 when the washing pipe 7 is being swung. Thus, the weight of the washing pipe 7 positioned at the separation position P4 is received not by the washing guide 5 which is movable but by the frame 108 which is not movable. Hence, it is possible to simplify the configuration of the washing guide mover 17 without particularly strengthening the structure of the washing guide mover 17.

Even when a large force is applied to the washing pipe 7 during the maintenance of the screen washing apparatus 1, it is possible for the large force to be reliably received by the frame 108 which has a relatively high rigidity.

In the screen washing apparatus 1, the washing pipe 7 is supported by the washing guide 5 without being directly engaged with the washing guide mover 17. The washing pipe 7 is movable forward by means of the washing guide mover 17 in the state where the washing pipe 7 is positioned at the discharge position P3.

Thus, it is not necessary to release the connection between the washing pipe 7 and the washing guide mover 17 when swinging the washing pipe 7 about the swing central axis C1 as the swing center. Further, it is possible to release the connection between the washing guide 5 and the washing pipe 7 and connect the washing pipe 7 with the hinge 19 at locations that are easy to reach for a worker. Hence, preparation for swinging the washing pipe 7 is easy.

If the washing pipe 7 is directly engaged with the washing guide mover 17, it is difficult for a worker to reach the engagement site between the washing pipe 7 and the washing guide mover 17 in the case where the screw press 101 is large.

In the screen washing apparatus 1, the washing pipe body 9 is formed in a semicircular arc shape, and the position of the center portion of the washing pipe body 9 and the position of the center portion of the outer cylinder screen 102 coincide with each other in the up-down direction. Also in the screen washing apparatus 1, the washing pipe swing supporter 15 allows the center portion of the washing pipe body 9 to be engaged with the hinge 19 such that the washing pipe 7 is capable of swinging about the prescribed swing central axis C1 extending in the up-down direction as the swing center.

Thus, it is possible with a simple structure to easily separate all the washing nozzles 11 of the washing pipe 7 having a semicircular arc shape from the outer cylinder screen 102 having a cylindrical shape.

In the screen washing apparatus 1, the washing pipe 7 is provided as a pair. Thus, it is possible to separately dismount one side of the washing pipes 7 and the other side of the washing pipes 7 at an inspection of the washing pipes 7, which facilitates the dismounting work. It is also possible to replace only one of the washing pipes 7 at a failure of the washing pipes 7.

In the screen washing apparatus 1, the pair of washing guides 5 has an annular shape, and the semicircular arc shapes of the washing pipe bodies 9 of the pair of washing pipes 7 respectively overlap the semicircular arc shapes of the pair of washing guides 5 in a view of the front-rear direction when the pair of washing pipes 7 is positioned at the discharge position P3. Thus, it is possible to simplify the configuration of the washing guide mover 17.

If a pair of washing pipes 7 is used, driving devices for the respective washing pipes 7 (driving devices for moving the respective washing pipes 7 in the front-rear direction) may be required. However, in the screen washing apparatus 1, the pair of washing pipes 7 is integral with the pair of washing guides 5 having an annular shape and thus only a single driving device is required.

In the screen washing apparatus 1, the washing guide mover 17 includes the rails 23 and the washing guide supporter 25, and the rails 23 extend in the front-rear direction to be apart from the washing guide 5 above the washing guide 5.

In the screen washing apparatus 1, the lower end of the washing guide supporter 25 is mounted on the washing guide 5 and the upper portion of the washing guide supporter protrudes upward from the washing guide 5. Due to engagement of the upper end of the washing guide supporter with the rails 23, the washing guide supporter 25 is movable in the front-rear direction.

Thus, it is possible to suppress adherence of washing liquid, dust, or the like to the rails 23 as much as possible, and prolong the maintenance interval (the time from the completion of the first maintenance to the performance of the second maintenance, for example) for the washing guide mover 17.

In the screen washing apparatus 1, the washing guide includes the positioning portion 27 for positioning the washing pipe 7 with respect to the washing guide 5 when the washing pipe 7 is mounted on the washing guide 5. Thus, it is possible to accurately and quickly position the washing pipe 7 with respect to the washing guide 5 when mounting the washing pipe 7 on the washing guide 5.

In the screw press 101, the outer cylinder screen 102 and other components are generally covered by the frame 108 which includes an openable and closable window(s) for handling odor. According to the configuration of the screen washing apparatus 1 described above, it is possible to easily install the screen washing apparatus 1 on the existing screw press 101 with minimal remodeling of the screw press 101. It is also possible to perform swinging of the washing pipe 7 and the like using the window(s) of the frame 108.

When the washing pipe 7 is swung (rotated) from the discharge position P3 toward the separation position P4, one washing nozzle 11B in contact with the second rectangular flat plate shaped member 35B is caught on the second rectangular flat plate shaped member 35B (reverse portion 39). In order to prevent this problem, the washing pipe 7 may be slightly raised obliquely upward, for example, such that the interference of one washing nozzle 11B with the second rectangular flat plate shaped member 35B can be avoided when the washing pipe 7 is mounted on the hinge 19.

In order to prevent the problem above, the second rectangular flat plate shaped member 35B may be configured to be easily attachable to and detachable from the washing guide body 29. Yet, in order to prevent the problem above, the shapes of one washing nozzle 11B and the second rectangular flat plate shaped member 35B may be designed so as to avoid the interference of one washing nozzle 11B with the second rectangular flat plate shaped member 35B.

In the description above, the hinge 19 is provided on the frame 108. However, the hinge 19 may be provided on the washing guide 5 such that the washing pipe 7 is swingable with respect to the washing guide 5.

Embodiments of the present invention have been described above. However, the invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

Moreover, the effects described in the embodiments of the present invention are only a list of optimum effects achieved by the present invention. Hence, the effects of the present invention are not limited to those described in the embodiment of the present invention.

What is claimed is:

1. An outer cylinder screen washing apparatus of a screw press, comprising:
    a washing guide provided on an outer side of an outer cylinder screen of the screw press;
    a washing pipe mounted on the washing guide and including a washing pipe body and washing nozzles provided in the washing pipe body, the washing nozzles configured to discharge washing liquid flowing from an inside of the washing pipe body toward the outer cylinder screen; and
    a washing pipe swing supporter configured to support the washing guide to allow the washing pipe to swing between a discharge position and a separation position, the discharge position being a position where the washing pipe is mounted on the washing guide and the washing liquid is discharged from the washing nozzles toward the outer cylinder screen, the separation position being a position where the washing nozzles are farther away from the outer cylinder screen than in a state where the washing pipe is positioned at the discharge position.

2. The outer cylinder screen washing apparatus of a screw press according to claim 1, further comprising a washing guide mover configured to move the washing guide together with the washing pipe in an extension direction of a central axis of the outer cylinder screen with the washing pipe being positioned at the discharge position,
    wherein, upon the washing pipe swinging, the washing pipe is supported, via a hinge included in the washing pipe swing supporter, by a frame which supports the outer cylinder screen.

3. The outer cylinder screen washing apparatus of a screw press according to claim 2, wherein
    the washing pipe body has a semicircular arc shape,
    a position of a center portion of the washing pipe body and a position of a center portion of the outer cylinder screen coincide with each other in an up-down direction, and
    the washing pipe swing supporter is configured to allow the washing pipe to swing with respect to the outer cylinder screen about a swing central axis extending in the up-down direction as a swing center with the center portion of the washing pipe body being engaged with the hinge.

4. The outer cylinder screen washing apparatus of a screw press according to claim 3, wherein
    the washing guide includes a first washing guide having a semicircular arc shape and a second washing guide having a semicircular arc shape, the first washing guide and the second washing guide connected to each other at connection sites forming an annular shape,
    one of the connection sites is positioned at upper ends of the first and second washing guides and the other of the connection sites is positioned at lower ends of the first and second washing guides,
    the washing pipe includes a first washing pipe with a first washing pipe body having a semicircular arc shape and a second washing pipe with a second washing pipe body having a semicircular arc shape, and
    with the first washing pipe and the second washing pipe being positioned at the discharge position, the semicircular arc shape of the first washing pipe body overlaps the semicircular arc shape of the first washing guide and the semicircular arc shape of the second washing pipe body overlaps the semicircular arc shape of the second washing guide in the extension direction.

5. The outer cylinder screen washing apparatus of a screw press according to claim 2, wherein
    the washing guide mover includes a rail and a washing guide supporter,
    the rail extends in a front-rear direction to be apart from the washing guide above the washing guide,
    a lower end of the washing guide supporter is provided in the washing guide,
    an upper portion of the washing guide supporter protrudes upward from the washing guide, and
    engagement of an upper end of the washing guide supporter with the rail enables the washing guide and the washing pipe to move in the extension direction with the washing pipe being positioned at the discharge position.

6. The outer cylinder screen washing apparatus of a screw press according to claim 1, wherein the washing guide includes a positioning portion for positioning the washing pipe with respect to the washing guide upon mounting of the washing pipe on the washing guide.

* * * * *